United States Patent [19]

Sudo et al.

[11] 4,303,554

[45] Dec. 1, 1981

[54] COMPOSITION AND PROCESS FOR PRODUCING TRANSPARENT CONDUCTIVE FILM

[75] Inventors: Ryoichi Sudo, Yokosuka; Masaaki Okunaka, Fujisawa; Hitoshi Yokono, Yokohama; Tokio Isogai, Fujisawa; Mitsuo Yamazaki, Hitachi, all of Japan

[73] Assignees: Hitachi, Ltd.; Hitachi Chemical Company, Ltd., both of Tokyo, Japan

[21] Appl. No.: 161,028

[22] Filed: Jun. 19, 1980

[30] Foreign Application Priority Data

Jun. 22, 1979 [JP] Japan .................................. 54-78215

[51] Int. Cl.³ .............................................. H01B 1/06
[52] U.S. Cl. .................................... 252/518; 106/1.05;
252/500; 427/126.2; 427/126.3; 427/372.2;
427/108; 427/110

[58] Field of Search .............................. 252/518, 500;
427/372.2, 421, 422, 126.1, 126.2, 126.3, 78,
108, 110, 74; 106/1.05; 350/150, 336, 339, 342;
313/370, 383, 390, 463

[56] References Cited

U.S. PATENT DOCUMENTS

| 2,564,677 | 8/1951 | Davis | 252/518 |
| 2,564,707 | 8/1951 | Mochel | 252/518 |
| 2,564,709 | 8/1951 | Mochel | 252/518 |
| 2,592,601 | 4/1962 | Raymond et al. | 252/518 |

Primary Examiner—J. L. Barr
Attorney, Agent, or Firm—Craig and Antonelli

[57] ABSTRACT

Transparent electroconductive film having no cracks and whitening is obtained by coating on a substrate a composition comprising an inorganic indium salt, a polybasic carboxylic acid or polybasic carboxylic acid anhydride and a solvent, and calcining the coated composition at a temperature of 300° to 700° C. under an atmosphere containing oxygen. When a tin compound is added to the composition, sheet resistance of the transparent electroconductive film can be adjusted favorably.

27 Claims, 1 Drawing Figure

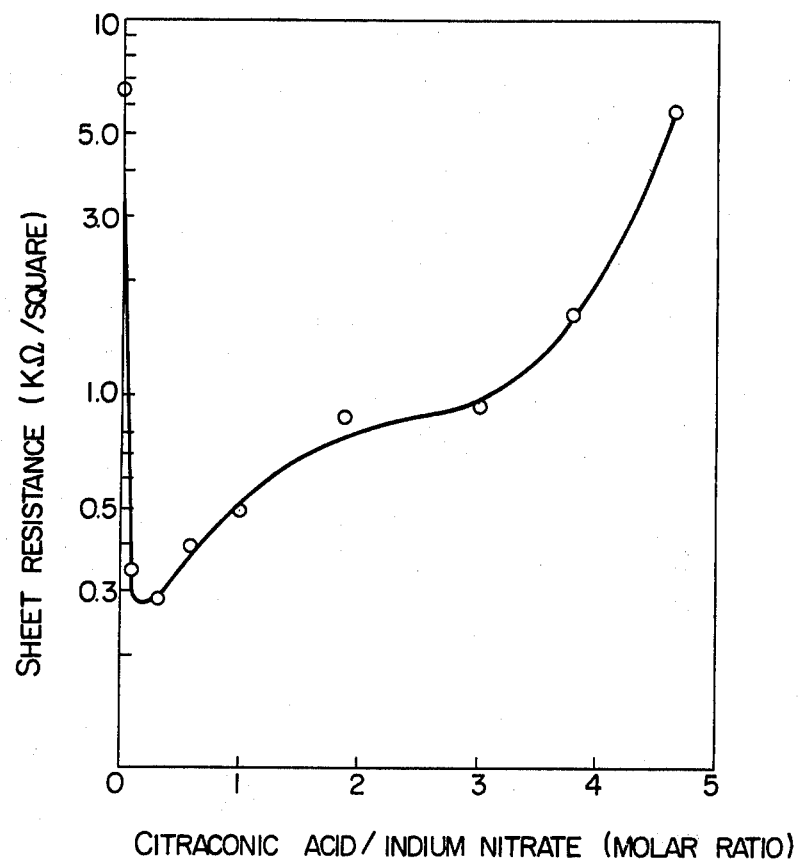

COMPOSITION AND PROCESS FOR PRODUCING TRANSPARENT CONDUCTIVE FILM

This invention relates to a composition for forming transparent electroconductive film on the surface of a substrate such as glass, ceramics, or the like and a process for forming such a transparent electroconductive film on a substrate.

Transparent electrodes which can pass light are used in display elements such as liquid crystal display elements, plasma display elements, electroluminescent display elements, etc., photosensitive elements such as photocells, television camera tubes, etc.

In order to form transparent electrodes, there have been known the following methods (1) to (3).

(1) A method for forming transparent electrodes comprising coating a solution obtained by dissolving an indium alkoxide such as diethylmonoethoxyindium $In(C_2H_5)_2.(OC_2H_5)$ and tin octoate $(C_7H_{15}COO)_2Sn$ in an alcohol such as butanol on a substrate such as a glass plate, drying the solution naturally followed by drying with heating at about 100° C. and calcining at 480° C. in the atmosphere (Japanese Patent Appln Kokai (Laid-Open) No. 45995/75).

(2) The same method as mentioned above (1) except for using a carboxylic acid salt of indium, $In(OOCR)_3$, in place of the indium alkoxide (Japanese Patent Appln Kokai (Liad-Open) No. 45995/75).

(3) A method for forming transparent electrodes comprising coating a solution obtained by dissolving indium naphthenate, and if necessary together with octylic acid in a benzene homologue such as toluene on a glass plate, heating the coating at 350° C. for 5 to 10 minutes in the atmosphere and calcining at 500° C. for 5 to 10 minutes (Japanese Patent Appln Kokai (Laid-Open) No. 1497/77).

According to these methods (1) to (3), however, a runaway phenomenon takes place in the case of coating on a glass plate and uniform coating is very difficult to obtain, and transparent electrodes obtained are readily whitened or cracked when they are calcined in the atmosphere. Therefore, it has been very difficult to form satisfactory high quality transparent electrodes according to the methods (1) to (3).

It is an object of this invention to overcome drawbacks of the conventional technics as mentioned above and to provide a composition for forming transparent electrodes with uniform thickness on a substrate without causing cracks when calcined in the atmosphere and to provide a process for producing transparent electrodes using such a composition.

This invention provides a composition for forming transparent electrodes comprising (A) an indium salt, (B) a polybasic carboxylic acid or (B') a polybasic carboxylic acid anhydride (a ligand), and if necessary (C) a tin compound (a dopant), and (D) an organic solvent for dissolving the ingredients (A) to (C), and a process for producing transparent electrodes comprising coating said liquid composition on a substrate, drying it under an atmosphere containing oxygen if necessary, and calcining it.

The attached drawing is a graph showing a relationship between sheet resistance and the molar ratio of citraconic acid to indium nitrate.

When the solution having the composition as mentioned above is used, since the solution becomes viscous by the formation of a complex of indium due to a slight reaction of an indium salt with a polybasic carboxylic acid or an indium salt with a polybasic carboxylic acid anhydride in the solution, uniform coating on a substrate becomes possible due to good wetting properties. Further, when such a composition is calcined, since it seems that polymerization between the complexes further proceed during the calcination, abnormal vaporization and scattering of the ingredients do not take place and anions of indium salt, ligands, and crystal water of indium salt are vaporized and scattered during the calcination, transparent electroconductive film of uniform quality can be obtained without causing cracking and whitening.

The ingredients constituting the composition are explained in detail below.

(A) Indium salt

It is preferable to use inorganic indium salts which can form a uniform solution with polybasic carboxylic acids or polybasic carboxylic acid anhydrides and can react with these acids or acid anhydrides very well. As the salts, chlorides, nitrates, perchlorates and the like of indium can preferably be used. These inorganic indium salts may be hydrates thereof. Examples of indium salts are $InCl_3.4H_2O$, $In(NO_3)_3.3H_2O$, $In(ClO_4)_3.8H_2O$, etc.

(B) Polybasic carboxylic acid (ligand)

As the polybasic carboxylic acids, those having 2 or more carboxyl groups in the molecule are useful. Particularly, those having 12 or less carbon atoms and 2 to 5 carboxyl groups in the molecule are preferable, and those having 4 to 8 carbon atoms and 2 to 5 carboxyl groups with one or more double bonds and side chains (e.g. citraconic acid) are more preferable from the viewpoint of low resistance value.

Examples of dibasic acids are oxalic acid, malonic acid, succinic acid, glutaric acid, adipic acid, pimelic acid, suberic acid, azelaic acid, sebacic acid, maleic acid, fumaric acid, citraconic acid, mesaconic acid, itaconic acid, methylmalonic acid, methylsuccinic acid, phthalic acid, tetrahydrophthalic acid, hexahydrophthalic acid, methyltetrahydrophthalic acid, methylhexahydrophthalic acid, etc.

Examples of tri- or higher polybasic carboxylic acids are copolymers of acrylic acid or methacrylic acid and acrylic acid ester methacrylic acid ester wherein the alcoholic moiety for forming ester has 1 to 12 carbon atoms, such as a copolymer of acrylic acid and methyl acrylate (1:6 in molar ratio) having an average molecular weight of 2000, etc.

(B') Polybasic carboxylic acid anhydride (ligand)

As the polybasic carboxylic acid anhydrides, there can be used those having one or more bonds of the formula:

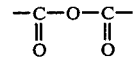

in the molecule, preferably those derived from dibasic carboxylic acids. There is a tendency to give transparent conductive film maintaining a low resistant value when a polybasic carboxylic acid anhdyride having 12 or less carbon atoms is used.

Examples of such acid anhydrides are succinic anhydride, maleic anhydride, citraconic anhydride, glutaric anhydride, phthalic anhydride, tetrahydrophthalic anhydride, hexahydrophthalic anhydride, methyltetrahydrophthalic anhydride, methylhexahydrophthalic anhydride, polyazelaic acid polyanhydride (e.g. that having a molecular weight of 2300), polysebacic acid polyanhydride, etc.

Mixing ratio of the polybasic carboxylic acid (B) to the indium salt (A) or the polybasic carboxylic acid anhydride (B') to the indium salt (A) is preferably B/A or B'/A=0.1 to 5.0/1 (molar ratio), more preferably B/A or B'/A=0.1 to 3.0/1 (molar ratio), so as to give transparent conductive film having good properties.

(C) Tin compound (dopand)

In order to adjust resistant values of transparent conductive film, an organic or inorganic tin compound can be added to the composition for forming transparent electrodes.

Examples of such tin compounds are

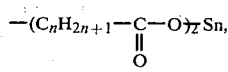

wherein n is an integer of 17 or less, preferably 3 to 10, e.g.

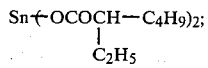

tin halides such as $SnCl_2$, $SnCl_4.3H_2O$, etc.

The amount of the tin compound to be added is tin compound/(indium salt+tin compound)=5 to 15% by mole. If the amount is less than 5% by mole or more than 15% by mole, the resistance value is increased.

(D) Solvent

As the solvents, those which can dissolve the indium salt and the polybasic carboxylic acid, or the indium salt and the polybasic carboxylic acid anhydride and functions as an assistant for the reaction between these compounds are preferable.

Examples of the solvents are water; aliphatic or alicyclic alcohols such as methanol, ethanol, propanol, isopropanol, butanol, α-terpineol, etc.; glycols such as ethylene glycol, propylene glycol, diethylene glycol, etc.; mono- and di-alkyl ethers of ethylene glycol and their derivatives such as methyl cellosolve, ethyl cellosolve, butyl cellosolve, ethyl cellosolve acetate; carbitol, etc. These solvents can be used alone or as a mixture thereof.

The proportions of the solvent and the solute (indium salt+ligand or indium salt+ligand+tin compound) are preferably 50 to 98% by weight of the former to 2 to 50% by weight of the latter. If the amount of the solute is more than 50% by weight, the solution is too viscous to coat on a substrate, while if less than 2% by weight, the resulting coating is too thin to give a desired resistance value.

The liquid composition is coated on a substrate made of, for example, glass, ceramics, etc. for forming transparent electroconductive film by a conventional process such as a dip coating process, a spin coating process, a spray coating process, a screen printing process, an offset printing process, or the like.

The liquid composition coated on a substrate is dried and calcined at a temperature of 300° to 700° C. for about 15 minutes to 3 hours under an atmosphere containing oxygen such as air.

This invention is illustrated by way of the following Examples.

EXAMPLE 1

An indium salt (a), (b) or (c) shown in Tables 1 and 2 and a polybasic carboxylic acid (g) to (o) shown in Table 1 or a polybasic carboxylic acid anhydride (p) to (t) shown in Table 2 in equimolar amounts were dissolved in a mixture of ethylene glycol and ethyl alcohol (1:1 by weight) and a tin compound (d) shown in Table 1 or (f) shown in Tables 1 and 2 was added to the solution so as to give liquid compositions (Run Nos. 1 to 20) as shown in Tables 1 and 2.

Each liquid composition was coated on a silica glass substrate by offset printing and dried in the air at 100° C. for 10 minutes to remove the solvent by vaporization to give a uniform coating. The coating was then calcined in the air at 500° C. for 1 hour to give transparent electroconductive film. Each transparent electroconductive film had sheet resistance of 2.1 KΩ/square or less as shown in Tables 1 and 2. Further, there were no cracking nor whitening on each electroconductive film and surface appearance was good.

As to the carbon number of dicarboxylic acids, sheet resistance is lowered with a decrease of the carbon number from 10 to 4 (Table 1, Run Nos. 5 to 10). Further, comparison of Run No. 5 and Run No. 11 of Table 1 shows that sheet resistance is lowered when a double bond is present in the molecule even if the carbon number is the same (4 in these cases). In addition, from comparison of Run No. 11 and No. 12, sheet resistance in the case of using citraconic acid which has a double bond and a side chain in the molecule is smaller than that in the case of using maleic acid. Among dicarboxylic acids, when citraconic acid is used, the lowest sheet resistance is obtained.

TABLE 1

| Run No. | | 1 | 2 | 3 | 4 | 5 | 6 | 7 | 8 | 9 | 10 | 11 | 12 | 13 |
|---|---|---|---|---|---|---|---|---|---|---|---|---|---|---|
| Composition | | | | | | | | | | | | | | |
| Metal salts | (a) $InCl_3 \cdot 4H_2O$ | 10 g (1) | — | — | — | — | — | — | — | — | — | — | — | — |
| | (b) $In(NO_3)_3 \cdot 3H_2O$ | — | 10 g (1) | — | 10 g (1) | 10 g (1) | 10 g (1) | 10 g (1) | 10 g (1) | 10 g (1) | 10 g (1) | 10 g (1) | 10 g (1) | 10 g (1) |
| | (c) $In(ClO_4)_3 \cdot 8H_2O$ | — | — | 10 g (1) | — | — | — | — | — | — | — | — | — | — |
| | (d) $SnCl_4 \cdot 3H_2O$ | — | — | — | 0.9 g (0.1) | — | — | — | — | — | — | — | — | — |
| | (e) $In(OCOCH-C_4H_9)_3$<br>  $\quad\,\,\,\,\,\,\,\,\,\,\,\,\|$<br>  $\quad\,\,\,\,\,\,\,\,\,\,\,C_2H_5$ | — | — | — | — | — | — | — | — | — | — | — | — | — |
| | (f) $Sn(OCOCH-C_4H_9)_2$<br>  $\quad\,\,\,\,\,\,\,\,\,\,\,\,\|$<br>  $\quad\,\,\,\,\,\,\,\,\,\,\,C_2H_5$ | 1.4 g (0.12) | 1.2 g (0.12) | 0.7 g (0.12) | — | 1.2 g (0.12) | 1.2 g (0.12) | 1.2 g (0.12) | 1.2 g (0.12) | 1.2 g (0.12) | 1.2 g (0.12) | 1.2 g (0.12) | 1.2 g (0.12) | 1.2 g (0.12) |
| Polybasic carboxylic acids | (g) Succinic acid $HOOC-(CH_2)_2-COOH$ | — | — | — | — | 3.4 g (1) | — | — | — | — | — | — | — | — |
| | (h) Glutaric acid $HOOC-(CH_2)_3-COOH$ | — | — | — | — | — | 3.8 g (1) | — | — | — | — | — | — | — |
| | (i) Adipic acid $HOOC-(CH_2)_4-COOH$ | — | — | — | — | — | — | 4.1 g (1) | — | — | — | — | — | — |
| | (j) Pimelic acid $HOOC-(CH_2)_5-COOH$ | — | — | — | — | — | — | — | 4.5 g (1) | — | — | — | — | — |
| | (k) Azelaic acid $HOOC-(CH_2)_7-COOH$ | — | — | — | — | — | — | — | — | 5.3 g (1) | — | — | — | — |
| | (l) Sebacic acid $HOOC-(CH_2)_8-COOH$ | — | — | — | — | — | — | — | — | — | 5.9 g (1) | — | — | — |
| | (m) Maleic acid $HOOC-CH=CH-COOH$ | — | — | — | — | — | — | — | — | — | — | 3.1 g (1) | — | — |
| | (n) Citraconic acid $HOOC-CH=C(CH_3)COOH$ | 4.5 g (1) | 3.6 g (1) | 2.3 g (1) | 4.0 g (1) | — | — | — | — | — | — | — | 1.8 g (0.5) | — |
| | (o) Copolymer of acrylic acid and methyl acrylate (1:6 molar ratio), av. mol. wt. 2000 | — | — | — | — | — | — | — | — | — | — | — | — | 5.0 g |
| Solvent | Ethylene glycol + ethyl alcohol (1:1 by wt.) | 84.1 g | 85.2 g | 87 g | 85.1 g | 85.4 g | 86.0 g | 84.7 g | 84.3 g | 83.5 g | 82.9 g | 85.7 g | 87.0 g | 83.8 g |
| Properties | | | | | | | | | | | | | | |
| | Sheet resistance (kΩ/square) | 0.9 | 0.5 | 0.5 | 0.8 | 0.8 | 1.0 | 1.4 | 1.5 | 1.7 | 2.1 | 0.5 | 0.4 | 0.5 |
| | Thickness of film (Å) | 800 | 700 | 800 | 800 | 900 | 900 | 900 | 900 | 900 | 900 | 800 | 700 | 900 |
| | Properties of film | Good | Good | Good | Good | Good | Good | Good | Good | Good | Good | Good | Good | Good |

(Note) The value in parentheses means a ratio by mole.

TABLE 2

| Run No. | | | 14 | 15 | 16 | 17 | 18 | 19 | 20 | 21 | 22 | 23 |
|---|---|---|---|---|---|---|---|---|---|---|---|---|
| Composition | | | | | | | | | | | | |
| Metal salts | (a) | $InCl_3 \cdot 4H_2O$ | 10 g (1) | — | — | — | — | — | — | — | — | — |
| | (b) | $In(NO_3)_3 \cdot 3H_2O$ | — | 10 g (1) | — | 10 g (1) | 10 g (1) | 10 g (1) | 10 g (1) | — | 10 g (1) | 10 g (1) |
| | (c) | $In(ClO_4)_3 \cdot 8H_2O$ | — | — | 10 g (1) | — | — | — | — | — | — | — |
| | (e) | $In(\!-\!OCOCH\!-\!C_4H_9)_3$<br>\|<br>$C_2H_5$ | — | — | — | — | — | — | — | 10 g (1) | — | — |
| | (f) | $Sn(OCOCH\!-\!C_4H_9)_2$<br>\|<br>$C_2H_5$ | 1.4 g (0.12) | 1.2 g (0.12) | 0.7 g (0.12) | 1.2 g (0.12) | 1.2 g (0.12) | 1.2 g (0.12) | 1.2 g (0.12) | 0.7 g (0.12) | 1.2 g (0.12) | 1.2 g (0.12) |
| Polybasic carboxylic acid anhydrides | (p) | Succinic anhydride<br>$CH_2\!-\!CO$<br>$\quad\quad\quad\;\;\;\;\searrow\!O$<br>$CH_2\!-\!CO$ | — | — | — | 2.9 g | — | — | — | — | Monobasic carboxylic acid*1 | |
| | (q) | Maleic anhydride<br>$CH\!-\!CO$<br>$\;\;\;\;\;\;\;\;\;\;\;\;\;\;\searrow\!O$<br>$CH\!-\!CO$ | 3.3 g (1) | 2.8 g (1) | 1.8 g (1) | — | — | — | — | — | 4.1 g (1) | 8.1 g (2) |
| | (r) | Glutaric anhydride<br>$\quad\quad CH_2\!-\!CO$<br>$CH_2\!\!<\quad\quad\;\;\searrow\!O$<br>$\quad\quad CH_2\!-\!CO$ | — | — | — | — | 3.3 g (1) | — | — | — | | |
| | (s) | Hexahydrophthalic anhydride 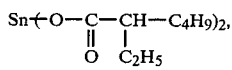 | — | — | — | — | — | 4.4 g (1) | — | — | | |
| | (t) | Polyazelaic polyanhydride (mol. wt. 2300) | — | — | — | — | — | — | 4.9 g | — | | |
| Solvent | | Ethylene glycol + ethyl alcohol (1:1 by wt.) | 85.3 g | 86.0 g | 87.5 g | 85.9gg | 85.5 g | 84.4 g | 83.9 g | 89.3 g | 84.7 g | 80.7 g |
| Properties | | | | | | | | | | | | |
| Sheet resistance (kΩ/square) | | | 1.0 | 0.5 | 0.6 | 0.5 | 0.7 | 1.0 | 1.0 | 3.0 | 4.0 | >5 |
| Thickness of film (Å) | | | 1000 | 1000 | 900 | 900 | 900 | 900 | 900 | 1000 | 900 | 900 |
| Properties of film | | | Good | Good | Good | Good | Good | Good | Good | Cracks Whitening | Whitening | Whitening |

(Note)
The value in parentheses means a ratio by mole.
*1 2-ethylhexanoic acid $C_4H_9\!-\!CH(C_2H_5)\!-\!COOH$

EXAMPLE 2

Indium nitrate $In(NO_3)_3 \cdot 3H_2O$ and citraconic acid were mixed so as to be citraconic acid/indium nitrate=0/1 to 4.6/1 in molar ratio and 10% by mole of tin 2-ethylhexanoate, $$Sn(\!-\!O\!-\!C\!-\!CH\!-\!C_4H_9)_2,$$
$$\quad\;\;\;\;\;\;\|\;\;\;\;\;|$$
$$\quad\;\;\;\;\;\;O\;\;\;\;C_2H_5$$

based on a total of indium nitrate and tin 2-ethylhexanoate was added thereto and the resulting mixture was dissolved in a mixed solvent obtained by mixing ethyl cellosolve and ethyl alcohol in 1:1 by weight to give liquid compositions containing 10% by weight of solute (indium nitrate+citraconic acid+tin 2-ethylhexanoate) and 90% by weight of the mixed solvent.

Individual liquid compositions were coated on individual silica glass substrates by offset printing and transparent electroconductive films were formed in the same manner as described in Example 1. The films had sheet resistance as shown in the attached drawing. As shown in the drawing, when the mixing ratio of citraconic acid/indium nitrate is 0.1 to 2.9/1 in molar ratio, sheet resistance becomes 1 kΩ/square or lower.

Comparative Examples 1-3

Using the compositions as shown in Run Nos. 21, 22 and 23 in Table 2, electroconductive films were formed on silica glass substrates in the same manner as described in Example 1. But the electroconductive films had cracks and whitened or only whitened.

What is claimed is:

1. A composition for forming a transparent electroconductive film comprising
   (A) an indium salt selected from the group consisting of a chloride, a nitrate and a perchlorate of indium and a hydrate thereof,
   (B) a polybasic carboxylic acid having 2 to 5 carboxyl groups in the molecule and having 12 or less carbon atoms, or
   (B') a polybasic carboxylic acid anhydride having 1 or more bonds of the formula:

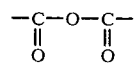

in the molecule and having 12 or less carbon atoms, and (D) a solvent for dissolving (A) and (B) or (B');
the molar ratio of B/A or B'/A=0.1 to 5.0/1 and A+B or B' is 2 to 50% by weight and D is 50 to 98% by weight.

2. A composition according to claim 1, wherein the indium salt (A) and the polybasic carboxylic acid (B) or the polybasic carboxylic acid anhydride (B') are present in a molar ratio of B/A or B'/A=0.1 to 3.0/1.

3. A composition according to claim 1, wherein the organic solvent is a mixture of ethyl alcohol and ethylene glycol or ethyl cellosolve.

4. A composition for forming transparent electroconductive film comprising
(A) an indium salt selected from indium chloride, indium nitrate and indium perchlorate,
(B) a polybasic carboxylic acid selected from succinic acid, glutaric acid, adipic acid, pimelic acid, azelaic acid, sebacic acid, maleic acid, citraconic acid, and a copolymer of acrylic acid and methyl acrylate in 1:6 molar ratio and having an average molecular weight of 2000, or
(B') a polybasic carboxylic acid anhdride selected from succinic anhydride, maleic anhydride, glutaric anhydride, hexahydrophthalic anhydride and polyazelaic polyanhydride having a molecular weight of 2300, and
(D) an organic solvent,
wherein the molar ratio of B/A or B'/A=0.1 to 5.0/1 and A+B or B' is 2 to 50% by weight and D is 50 to 98% by weight.

5. A composition according to claim 4, wherein the molar ratio of the polybasic carboxylic acid (B) or the polybasic carboxylic acid anhydride (B') to the indium salt (A) is B/A or B'/A=0.1 to 3.0/1.

6. A composition according to claim 4 or 5, wherein the organic solvent is a mixture of ethyl alcohol and ethylene glycol or ethyl cellosolve.

7. A composition for forming a transparent electroconductive film comprising
(A) an indium salt selected from the group consisting of a chloride, a nitrate and perchlorate of indium and a hydrate thereof,
(B) a polybasic carboxylic acid having 2 to 5 carboxyl groups in the molecule and having 12 or less carbon atoms, or
(B') a polybasic carboxylic acid anhydride having 1 or more bonds of the formula:

$$-\underset{\underset{O}{\|}}{C}-O-\underset{\underset{O}{\|}}{C}-$$

in the molecule and having 12 or less carbon atoms,
(C) a tin compound selected from the group consisting of a tin compound of the formula:

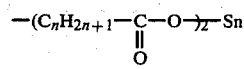

in which n is an integer of 17 or less and a tin halide, and
(D) a solvent for dissolving (A), (B) or (B') and (C);
the molar ratio of B/A over B'/A=0.1 to 5.0/1, the ratio of the tin compound/(the indium salt plus the tin compound)=5 to 15% by mole, and a total of A+B or B'+C is 2 to 50% by weight and D is 50 to 98% by weight.

8. A composition according to claim 7, wherein the molar ratio of the polybasic carboxylic acid (B) or the polybasic carboxylic acid anhydride (B') to the indium salt (A) is B/A or B'/A=0.1 to 3.0/1.

9. A composition according to claim 1, wherein the organic solvent is a mixture of ethyl alcohol and ethylene glycol or ethyl cellosolve.

10. A composition for forming transparent electroconductive film comprising
(A) an indium salt selected from indium chloride, indium nitrate and indium perchlorate,
(B) a polybasic carboxylic acid selected from succinic acid, glutaric acid, adipic acid, pimelic acid, azelaic acid, sebacic acid, maleic acid, citraconic acid, and a copolymer of acrylic acid and methyl acrylate in 1:6 molar ratio and having an average molecular weight of 2000, or
(B') a polybasic carboxylic acid anhydride selected from succinic anhydride, maleic anhydride, glutaric anhydride, hexahydrophthalic anhydride and polyazelaic polyanhydride having a molecular weight of 2300,
(C) a tin compound selected from a compound of the formula

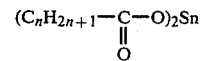

wherein n is an integer of 17 or less and a tin halide, and
(D) an organic solvent for dissolving the ingredients (A), (B) or (B'), and (C),
wherein the molar ratio of B/A or B'/A=0.1 to 5.0/1, the ratio of the tin compound/(the indium salt+the tin compound)=5 to 15% by mole, and a total of A+B or B'+C is 2 to 50% by weight and D is 50 to 98% by weight.

11. A composition according to claim 10, wherein the molar ratio of the polybasic carboxylic acid (B) or the polybasic carboxylic acid anhydride (B') to the indium salt (A) is B/A or B'/A=0.1 to 3.0/1.

12. A composition according to claim 10 or 11, wherein the organic solvent is a mixture of ethyl alcohol and ethylene glycol or ethyl cellosolve.

13. A process for forming a transparent electroconductive film which comprises coating on a substrate a liquid composition comprising
(A) an indium salt selected from the group consisting of a chloride, a nitrate and a perchlorate of indium and a hydrate thereof,
(B) a polybasic carboxylic acid having 2 to 5 carboxyl groups in the molecule and having 12 or less carbon atoms, or
(B') a polybasic carboxylic acid anhydride having 1 or more bonds of the formula:

$$-\underset{\underset{O}{\|}}{C}-O-\underset{\underset{O}{\|}}{C}-$$

in the molecule and having 12 or less carbon atoms, and
(D) a solvent dissolving (A) and (B) or (B'); a molar ratio of B/A or B'/A=0.1 to 5.0/1 and A+B or B' is 2 to 50% by weight and D is 50 to 98% by weight, and calcining the coated composition at a temperature of 300° to 700° C. under an atmosphere containing oxygen.

14. A process according to claim 13, wherein the molar ratio of the polybasic carboxylic acid (B) or the polybasic carboxylic acid anhydride (B') to the indium salt (A) is B/A or B'/A=0.1 to 3.0/1.

15. A process according to claim 13 or 14, wherein the indium salt (A) is indium chloride, indium nitrate or indium perchlorate, the polybasic carboxylic acid (B) is succinic acid, glutaric acid, adipic acid, pimelic acid, azelaic acid, sebacic acid, maleic acid, citraconic acid, or a copolymer of acrylic acid and methyl acrylate in 1:6 molar ratio and having an average molecular weight of 2000, the polybasic carboxylic acid anhydride (B') is succinic anhydride, maleic anhydride, glutaric anhydride, hexahydrophthalic anhydride, or polyazelaic polyanhydride having a molecular weight of 2300 and the solvent (D) is an organic solvent.

16. A process according to claim 15, wherein the organic solvent is a mixture of ethyl alcohol and ethylene glycol or ethyl cellosolve.

17. A process for forming transparent electroconductive film which comprises coating on a substrate a liquid composition comprising
  (A) an indium salt selected from indium chloride, indium nitrate and indium perchlorate,
  (B) a polybasic carboxylic acid selected from succinic acid, glutaric acid, adipic acid, pimelic acid, azelaic acid, sebacic acid, maleic acid, citraconic acid, and a copolymer of acrylic acid and methyl acrylate in 1:6 molar ratio and having an average molecular weight of 2000, or
  (B') a polybasic carboxylic acid anhydride selected from succinic anhydride, maleic anhydride, glutaric anhydride, hexahydrophthalic anhydride and polyazelaic polyanhydride having a molecular weight of 2300, and
  (D) an organic solvent,
wherein the molar ratio of B/A or B'/A=0.1 to 5.0/1 and A+B or B' is 2 to 50% by weight and D is 50 to 98% by weight, and calcining the coated composition at a temperature of 300° to 700° C. under an atmosphere containing oxygen.

18. A process according to claim 17, wherein the molar ratio of the polybasic carboxylic acid (B) or the polybasic carboxylic acid anhydride (B') to the indium salt (A) is B/A or B'/A=0.1 to 3.0/1.

19. A process according to claim 17 or 18, wherein the organic solvent is a mixture of ethyl alcohol and ethylene glycol or ethyl cellosolve.

20. A process for forming a transparent electroconductive film which comprises coating on a substrate a liquid composition comprising
  (A) an indium salt selected from the group consisting of a chloride, a nitrate, and a perchlorate of indium and a hydrate thereof,
  (B) a polybasic carboxylic acid having 2 to 5 carboxyl groups in the molecule and having 12 or less carbon atoms, or
  (B') a polybasic carboxylic acid anhydride having 1 or more bonds of the formula:

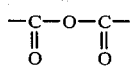

in the molecule and having 12 or less carbon atoms, (C) a tin compound selected from the group consisting of a tin compound of the formula:

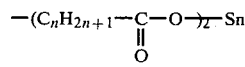

in which n is an integer of 17 or less and a tin halide, and
(D) a solvent dissolving (A), (B) or (B'), and (C); the molar ratio of B/A or B'/A=0.1 to 5.0/1, the ratio of the tin compound/(the indium salt plus the tin compound/)=5 to 15% by mole, and a total of A+B or B'+C is 2 to 50% by weight and D is 50 to 98% by weight, and calcining the coated composition at a temperature of 300° to 700° under an atmosphere containing oxygen.

21. A process according to claim 20, wherein the molar ratio of the polybasic carboxylic acid (B) or the polybasic carboxylic acid anhydride (B') to the indium salt (A) is B/A or B'/A=0.1 to 3.0/1.

22. A process according to claim 1, wherein the organic solvent is a mixture of ethyl alcohol and ethylene glycol or ethyl cellosolve.

23. A process for forming transparent electroconductive film which comprises coating on a substrate a liquid composition comprising
  (A) an indium salt selected from indium chloride, indium nitrate and indium perchlorate,
  (B) a polybasic carboxylic acid selected from succinic acid, glutaric acid, adipic acid, pimelic acid, azelaic acid, sebacic acid, maleic acid, citraconic acid, and a copolymer of acrylic acid and methyl acrylate in 1:6 molar ratio and having an average molecular weight of 2000, or
  (B') a polybasic carboxylic acid anhydride selected from succinic anhydride, maleic anhydride, glutaric anhydride, hexahydrophthalic anhydride and polyazelaic polyanhydride having a molecular weight of 2300,
  (C) a tin compound selected from a compound of the formula

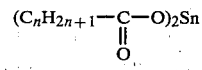

wherein n is an integer of 17 or less and a tin halide, and
(D) an organic solvent for dissolving the ingredients (A), (B) or (B'), and (C), wherein the molar ratio of B/A or B'/A=0.1 to 5.0/1, the ratio of the tin compound/(the indium salt+the tin compound)=5 to 15% by mole, and a total of A+B or B'+C is 2 to 50% by weight and D is 50 to 98% by weight, and calcining the coated composition at a temperature of 300° to 700° C. under an atmosphere containing oxygen.

24. A process according to claim 23, wherein the molar ratio of the polybasic carboxylic acid (B) or the polybasic carboxylic acid anhydride (B') to the indium salt (A) is B/A or B'/A=0.1 to 3.0/1.

25. A process according to claim 23 or 24, wherein the organic solvent is a mixture of ethyl alcohol and ethylene glycol or ethyl cellosolve.

26. A composition according to claim 1, wherein the polybasic carboxylic acid has one or more double bonds.

27. A composition according to claim 1, wherein the polybasic acid is selected from the group consisting of oxalic acid, malonic acid, succinic acid, glutaric acid, adipic acid, pimelic acid, suberic acid, azelaic acid, sebacic acid, maleic acid, fumaric acid, citraconic acid, mesaconic acid, itaconic acid, methylmalonic acid, methylsuccinic acid, phthalic acid, tetrahydrophthalic acid, hexahydrophthalic acid, methyltetrahydrophthalic acid, and methylhexahydrophthalic acid.

* * * * *